United States Patent
Chavez et al.

(10) Patent No.: US 9,286,713 B2
(45) Date of Patent: *Mar. 15, 2016

(54) 3D DESIGN AND COLLABORATION OVER A NETWORK

(71) Applicant: zSpace, Inc., Sunnyvale, CA (US)

(72) Inventors: David A. Chavez, San Jose, CA (US); Jerome C. Tu, Saratoga, CA (US); Carola F. Thompson, Mountain View, CA (US); Mark F. Flynn, San Jose, CA (US); Douglas C. Twilleager, Campbell, CA (US); Kevin D. Morishige, Los Altos Hills, CA (US); Peter F. Ullmann, San Jose, CA (US); Arthur L. Berman, San Jose, CA (US)

(73) Assignee: zSpace, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/837,669

(22) Filed: Aug. 27, 2015

(65) Prior Publication Data

US 2015/0363964 A1     Dec. 17, 2015

Related U.S. Application Data

(63) Continuation of application No. 14/538,300, filed on Nov. 11, 2014, which is a continuation of application No. 14/085,272, filed on Nov. 20, 2013, now Pat. No. 8,903,958.

(51) Int. Cl.
| | |
|---|---|
| *G06F 15/16* | (2006.01) |
| *G06T 15/08* | (2011.01) |
| *H04L 29/08* | (2006.01) |
| *G06F 12/00* | (2006.01) |

(52) U.S. Cl.
CPC .......... *G06T 15/08* (2013.01); *H04L 29/08072* (2013.01); *H04L 67/10* (2013.01); *G06T 2200/04* (2013.01); *G06T 2215/12* (2013.01)

(58) Field of Classification Search
USPC ................. 709/203, 217–219, 223–229, 250
See application file for complete search history.

(56) References Cited

U.S. PATENT DOCUMENTS

| | | | | |
|---|---|---|---|---|
| 8,903,958 | B1 * | 12/2014 | Chavez | G06F 3/04815 |
| | | | | 709/219 |
| 9,153,069 | B2 * | 10/2015 | Chavez | G06F 3/04815 |
| 2006/0066609 | A1 | 3/2006 | Iodice | |
| 2009/0015585 | A1 | 1/2009 | Klusza | |

(Continued)

*Primary Examiner* — Zarni Maung
(74) *Attorney, Agent, or Firm* — Meyertons Hood Kivlin Kowert & Goetzel, P.C.; Jeffrey C. Hood; Mark S. Williams (57) ABSTRACT

In some embodiments, a system and/or method may include accessing three-dimensional (3D) imaging software on a remote server. The method may include accessing over a network a 3D imaging software package on a remote server using a first system. The method may include assessing, using the remote server, a capability of the first system to execute the 3D imaging software package. The method may include displaying an output of the 3D imaging software using the first system based upon the assessed capabilities of the first system. In some embodiments, the method may include executing a first portion of the 3D imaging software using the remote server based upon the assessed capabilities of the first system. In some embodiments, the method may include executing a second portion of the 3D imaging software using the first system based upon the assessed capabilities of the first system.

20 Claims, 3 Drawing Sheets

(56) References Cited

U.S. PATENT DOCUMENTS

| | | |
|---|---|---|
| 2009/0021513 A1 | 1/2009 | Joshi |
| 2009/0021514 A1 | 1/2009 | Klusza |
| 2010/0194860 A1 | 8/2010 | Mentz |
| 2012/0162384 A1 | 6/2012 | Vesely |
| 2012/0236031 A1 | 9/2012 | Haddick |
| 2013/0229711 A1 | 9/2013 | Kato |
| 2013/0329985 A1 | 12/2013 | Helin |
| 2014/0082472 A1 | 3/2014 | Sitrick |
| 2014/0085501 A1 | 3/2014 | Tran |

* cited by examiner

FIG. 4

3D DESIGN AND COLLABORATION OVER A NETWORK

PRIORITY DATA

This application is a continuation of U.S. patent application Ser. No. 14/538,300, titled "SYSTEM AND METHODS FOR CLOUD BASED 3D DESIGN AND COLLABORATION", filed Nov. 11, 2014, whose inventors are David A. Chavez, Jerome C. Tu, Carola F. Thompson, Mark F. Flynn, Douglas C. Twilleager, Kevin D. Morishige, Peter F. Ullmann, and Arthur L. Berman, which is a continuation of U.S. patent application Ser. No. 14/085,272, titled "SYSTEM AND METHODS FOR CLOUD BASED 3D DESIGN AND COLLABORATION", filed Nov. 20, 2013, and issued Dec. 2, 2014 as U.S. Pat. No. 8,903,958, whose inventors are David A. Chavez, Jerome C. Tu, Carola F. Thompson, Mark F. Flynn, Douglas C. Twilleager, Kevin D. Morishige, Peter F. Ullmann, and Arthur L. Berman, which are both hereby incorporated by reference in their entirety as though fully and completely set forth herein.

BACKGROUND OF THE INVENTION

1. Field of the Invention

The present disclosure generally relates to cloud based collaboration. More particularly, the disclosure generally relates to systems and methods for accessing three-dimensional imaging software on a remote server.

2. Description of the Relevant Art

Three dimensional (3D) capable electronics and computing hardware devices and real-time computer-generated 3D computer graphics have been a popular area of computer science for the past few decades, with innovations in visual, audio, tactile and biofeedback systems. Much of the research in this area has produced hardware and software products that are specifically designed to generate greater realism and more natural computer-human interfaces. These innovations have significantly enhanced and simplified the end-user's computing experience.

Typical 3D computing software requires intensive computational power. Even powerful systems designed and dedicated to execute 3D computing software may require computational assistance and/or additional storage at times. Additionally a user running a dedicated 3D system may wish to collaborate with others using the 3D computing software. One or more of these collaborators may be using computer systems with different and/or less capabilities than the dedicated 3D system.

Regarding this last point, some collaborators may have a computer system that does not have a 3D display and/or head tracking Some of the collaborator's computer systems may lack a stylus or, stated more generally, may have limited input capability. In addition, the local computational power and storage capacity of the collaborator's computer systems may be limited in absolute terms or in comparison to the dedicated 3D computer system. Computer systems having such reduced capabilities are sometimes but not necessarily referred to as "thin client devices."

Examples of non-dedicated 3D computer systems that can be used in a collaboration and that may have limited capabilities include laptop computers, tablets and smart phones. It should be noted, however, that tablets and smart phones usually have 3 axis orientation detection capabilities.

The simplest case of the collaboration situation described above has been partially addressed by current technology and product offerings. The simplest case referred is represented by the on-line collaboration between gamers. Such users might have a computer system that includes a 2D display and input devices such a mouse or trackball. A subset of such computer systems might have limited gesture recognition capability.

The on-line collaboration described above is accomplished by the user's systems communicating through the Internet with a server. That is, each user's computer system communicates with the server providing information developed, in part, from the user's use of their system's input devices. (In a first person shooter game, think user's point of view and weapon use.) The server integrates the input from all of the users and provides a harmonized output to each user's computer system.

In the configuration just described, the computational burden is generally local. That is, most of the computations required to produce the information sent to and from the server is accomplished at the individual user's computer system. If the user's computer has fast computational capability, the video imagery will appear without delay. If the user's computer has less computational capability, there may be a delay in the video imagery or a limitation in the user's ability to control the video imagery.

The challenge faced in a collaboration of 3D computing software users can be even greater than that of a collaboration of conventional gamers. This is due, in part, to the additional computational "overhead" associated with the wide range of capabilities resident in a 3D computer system. The additional overhead only starts with the 3D display being stereoscopic. It goes on to include determining the user's position and orientation (that is, point of view in 3D space) based on input from a head tracker. Added to this is overhead associated with the user's manipulation of objects in 3D space based on input from 3D input devices. These additional tasks can put a great burden on the local computer. With this in mind, dedicated 3D computer systems are designed with considerable local computational power and storage capacity. None-the-less, if the collaboration involves complex subject matter, it may be found desirable by the users to have access to additional capabilities.

Part of the incentive for this computational capability is the more stringent requirement on latency/delay that a head-tracked 3D system places on over system performance. Latency that would have been acceptable, for example, to 2D gamers are no longer acceptable for 3D rendering. This is due, in part, because the latency may cause physical discomfort or even headaches for the user. Low latency is no longer a "convenience" factor but a strong requirement for usability. This latency requirement has implications on both local computational capabilities as well as the network communication bandwidth.

The situation can be even more challenging if the collaboration includes both dedicated 3D and non-dedicated 3D computer systems. Those non-dedicated 3D computer systems having limited computational ability and storage capacity may have difficulty in "keeping up." As before, the result can be a delay in the video or a limitation in the user's ability to control the video imagery. Users of such thin client systems would definitely find it desirable to have access to additional capabilities.

A separate but equally important issue relates to the fact that, when some of the users in the collaboration do not have a dedicated 3D computer system, the inputs from the non-dedicated 3D computer systems can be quite different from the dedicated 3D computer system as well as from each other. As a consequence, it can be a substantial task for the server to harmonize the inputs from all of the collaborators.

There is, therefore, need for means to allow users and members of a collaboration to access additional computational capability and storage capacity. There is, therefore, need for systems and/or methods to enable a mixture of dedicated 3D and non-dedicated 3D computer system users to collaborate effectively is highly desirable. In as much as the systems/methods proposed in this disclosure are Cloud-based, there is also need for systems/methods to address the issue of what happens if the Cloud goes down.

SUMMARY

In some embodiments, a system and/or method may include accessing three-dimensional (3D) imaging software on a remote server. The method may include accessing over a network a 3D imaging software package on a remote server using a first system. The method may include assessing, using the remote server, a capability of the first system to execute the 3D imaging software package. The method may include displaying an output of the 3D imaging software using the first system based upon the assessed capabilities of the first system. In some embodiments, the method may include executing a first portion of the 3D imaging software using the remote server based upon the assessed capabilities of the first system. In some embodiments, the method may include executing a second portion of the 3D imaging software using the first system based upon the assessed capabilities of the first system.

BRIEF DESCRIPTION OF THE DRAWINGS

Advantages of the present invention may become apparent to those skilled in the art with the benefit of the following detailed description of the preferred embodiments and upon reference to the accompanying drawings.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third die electrically connected to the module substrate" does not preclude scenarios in which a "fourth die electrically connected to the module substrate" is connected prior to the third die, unless otherwise specified. Similarly, a "second" feature does not require that a "first" feature be implemented prior to the "second" feature, unless otherwise specified.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. §112, paragraph six, interpretation for that component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

It is to be understood the present invention is not limited to particular devices or biological systems, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Thus, for example, reference to "a linker" includes one or more linkers.

DETAILED DESCRIPTION

Definitions

Unless defined otherwise, all technical and scientific terms used herein have the same meaning as commonly understood by one of ordinary skill in the art.

The term "6 Degree-of-freedom" (6DOF) as used herein generally refers to three coordinates of position (x, y, z) and three coordinates of orientation (yaw, pitch, roll) that are measured and/or reported for any tracked target or object.

The term "connected" as used herein generally refers to pieces which may be joined or linked together.

The term "coupled" as used herein generally refers to pieces which may be used operatively with each other, or joined or linked together, with or without one or more intervening members.

The term "directly" as used herein generally refers to one structure in physical contact with another structure, or, when used in reference to a procedure, means that one process effects another process or structure without the involvement of an intermediate step or component.

The term "eyepoint" as used herein generally refers to the physical viewpoint of a single eye or a pair of eyes. A viewpoint above may correspond to the eyepoint of a person. For example, a person's eyepoint in the physical space has a corresponding viewpoint in the virtual space.

The term "head tracking" as used herein generally refers to tracking the position/orientation of the head in a volume. This allows the user to "look around" a virtual reality environment simply by moving the head without the need for a separate controller to change the angle of the imagery.

The term "position/orientation" as used herein generally refers to a position, but may be understood to mean position/orientation in at least 2 degrees of freedom (e.g., one dimension position and one dimension orientation . . . X, rotation). Position/orientation may be relative or absolute, as desired. Position/orientation may also include yaw, pitch, and roll information, e.g., when defining the orientation of a viewpoint.

The term "referenced" as used herein generally refers to a known and/or calculated (e.g., to a processor) precise position/orientation relation of a first object(s) (e.g., a sensor) to a second object(s) (e.g., a display device). The relationship, in some embodiments, may be predetermined in that the relationship is fixed (e.g. physically fixed as in using precision spatial mounts) such that the relationship is not adjustable after initial assembly (e.g., wherein the first object and the second object are assembled together as part of a single device). The relationship, in some embodiments, may be determined, during use, through a process (e.g., an initialization process, which may include a calibration and/or measurement process) which determines a precise spatial position/orientation relation of the first object(s) (e.g., a sensor) to the second object(s) (e.g., a display device).

The term "viewpoint" as used herein generally has the full extent of its ordinary meaning in the field of computer graphics/cameras. For example, the term "viewpoint" may refer to a single point of view (e.g., for a single eye) or a pair of points of view (e.g., for a pair of eyes). Thus, viewpoint may refer to the view from a single eye, or may refer to the two points of view from a pair of eyes. A "single viewpoint" may specify that the viewpoint refers to only a single point of view and a "paired viewpoint" or "stereoscopic viewpoint" may specify that the viewpoint refers to two points of view (and not one). Where the viewpoint is that of a user, this viewpoint may be referred to as an eyepoint. The term "virtual viewpoint" refers to a viewpoint from within a virtual representation or 3D scene.

Figure 1:
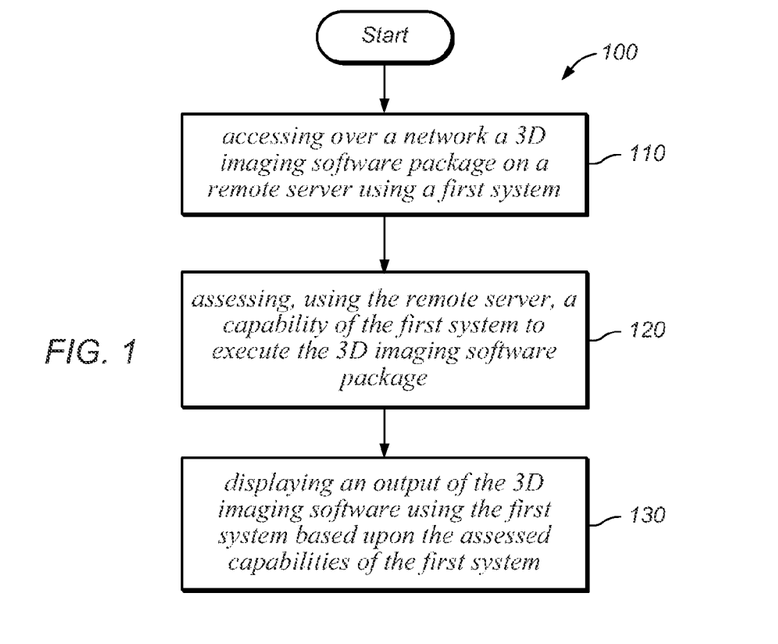
FIG. 1 depicts a diagram of an embodiment of a method for locally accessing three-dimensional (3D) imaging software on a remote server.

FIG. 1 depicts a diagram of an embodiment of a method 100 for locally accessing three-dimensional (3D) imaging software on a remote server. The method may include accessing 110 over a network a 3D imaging software package on a remote server using a first system. The method may include assessing 120, using the remote server, a capability of the first system to execute the 3D imaging software package. The method may include displaying 130 an output of the 3D imaging software using the first system based upon the assessed capabilities of the first system. In some embodiments, the method may include executing a first portion of the 3D imaging software using the remote server based upon the assessed capabilities of the first system. In some embodiments, the method may include executing a second portion of the 3D imaging software using the first system based upon the assessed capabilities of the first system.

In some embodiments, a remote server may include a computer system or more abstractly, as computer processing power and storage capacity in the "Cloud." By concept, the Cloud computer has CPU, GPU and storage capabilities much greater than that typically resident in any individual user's computer system.

In some embodiments, cloud computing is an expression as used herein generally referring to a variety of different types of computing concepts that involve a large number of computers connected through a real-time communication network (e.g., the internet). In some embodiments, cloud computing is an expression as used herein generally referring to one or more computers connected through a real-time communication network (e.g., the internet).

Typically, cloud computing generally refers to distributed computing over a network and means the ability to run a program on many connected computers at the same time. The phrase is also more commonly used to refer to network-based services which appear to be provided by real server hardware, which in fact is served up by virtual hardware, simulated by software running on one or more real machines. Such virtual servers do not physically exist and can therefore be moved around and scaled up (or down) on the fly without affecting the end user.

Cloud computing generally relies on sharing resources to achieve coherence and economies of scale. At the foundation of cloud computing is the broader concept of converged infrastructure and shared services.

The cloud also focuses on maximizing the effectiveness of the shared resources. Cloud resources are usually not only shared by multiple users but are also dynamically re-allocated as needed. More importantly this may also function for allocating resources to users as needed. For example, a cloud computer facility, which serves European users during European business hours with a specific application while the same resources are getting reallocated and serve North American users during North America's business hours with another application (e.g. web server). This approach should maximize the use of computing powers thus reducing environmental damage as well since less power, air conditioning, rackspace, etc. is required for a variety of functions.

The term "moving to cloud" also refers to an organization moving away from a traditional capital expenditures (CAPEX) model (buy the dedicated hardware and depreciate it over a period of time) to the operational expenditures (OPEX) model (use a shared cloud infrastructure and pay as you use it).

Cloud computing may allow companies to avoid upfront infrastructure costs, and focus on projects that differentiate their businesses instead of infrastructure. Cloud computing may allow enterprises to get their applications up and running faster, with improved manageability and less maintenance, and enables IT to more rapidly adjust resources to meet fluctuating and unpredictable business demand.

In some embodiments, a dedicated 3D computer system user may desire access to additional computational capability and/or storage capacity.

The dedicated 3D computer system may use a network (e.g., the internet) to connect to a remote server. According to this disclosure, when operating in a Cloud-based mode, only a limited amount of "unprocessed" information developed at the user's computer system may be transmitted to the Cloud server.

Figure 2:
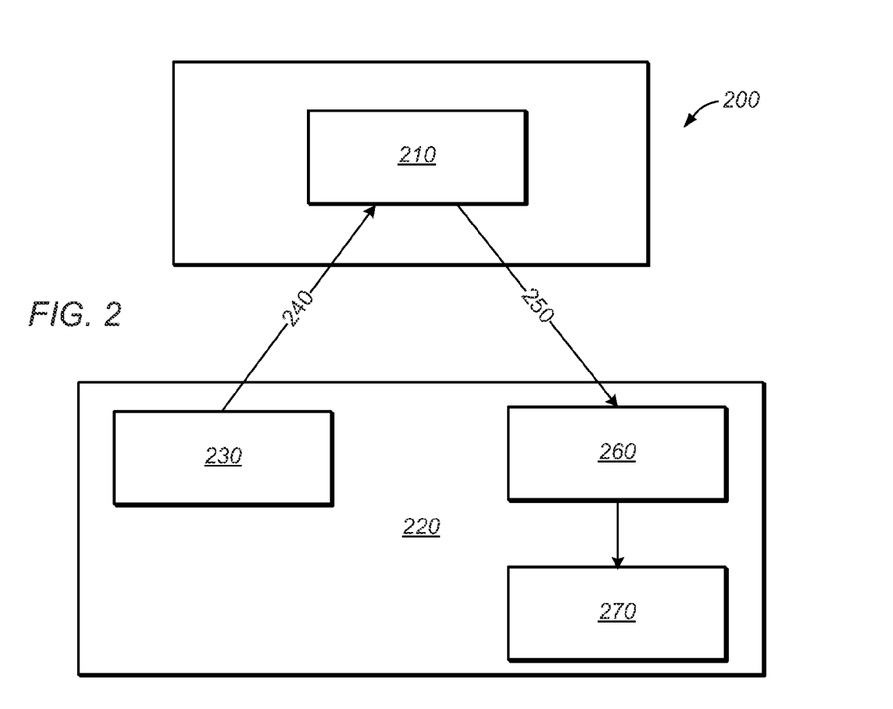
FIG. 2 depicts a diagram of an embodiment of a system of a remote server which functions to execute three-dimensional (3D) imaging software.

FIG. 2 depicts a diagram of an embodiment of a system 200 of a remote server 210 (e.g., a Cloud server) which functions to execute three-dimensional (3D) imaging software. For example, parameters describing the user head orientation and position may be transmitted 240 to the Cloud server 210 from a local system 220. The user's head orientation/position may be tracked using a tracking system 230 which functions in combination with or as part of local system 220. Based on this information, the Cloud server may compute the 3D image from the user's point of view. This information may be sent back to the user's computer system 220 as a video stream 250 requiring, in some embodiments, little processing (e.g., on local system's 220 processor 260) before presentation on a display 270 of the user's computer system 220. In this way, much of the computational burden is transferred from the user's computer to the Cloud server. In some embodiments, the method may include assessing, using the remote server, where a user's viewpoint of the first system will be based upon data gathered by the first system. Predicting a user's viewpoint in the immediate future based upon gathered data may increase the efficiency and reduce latency of the image displayed by the 3D imaging software on the local system.

In some embodiments, the "working product" (3D model, scene or the like) of the computation may be stored in the Cloud server. In some embodiments, the application/program itself may reside in the Cloud server. In both these cases, the need for capabilities and/or capacities are further shifted from the user's computer system to the more capable Cloud server.

In some embodiments, collaboration may involve user's having similar dedicated 3D computer systems or in which some of the user's have non-dedicated 3D computer systems.

Figure 3:
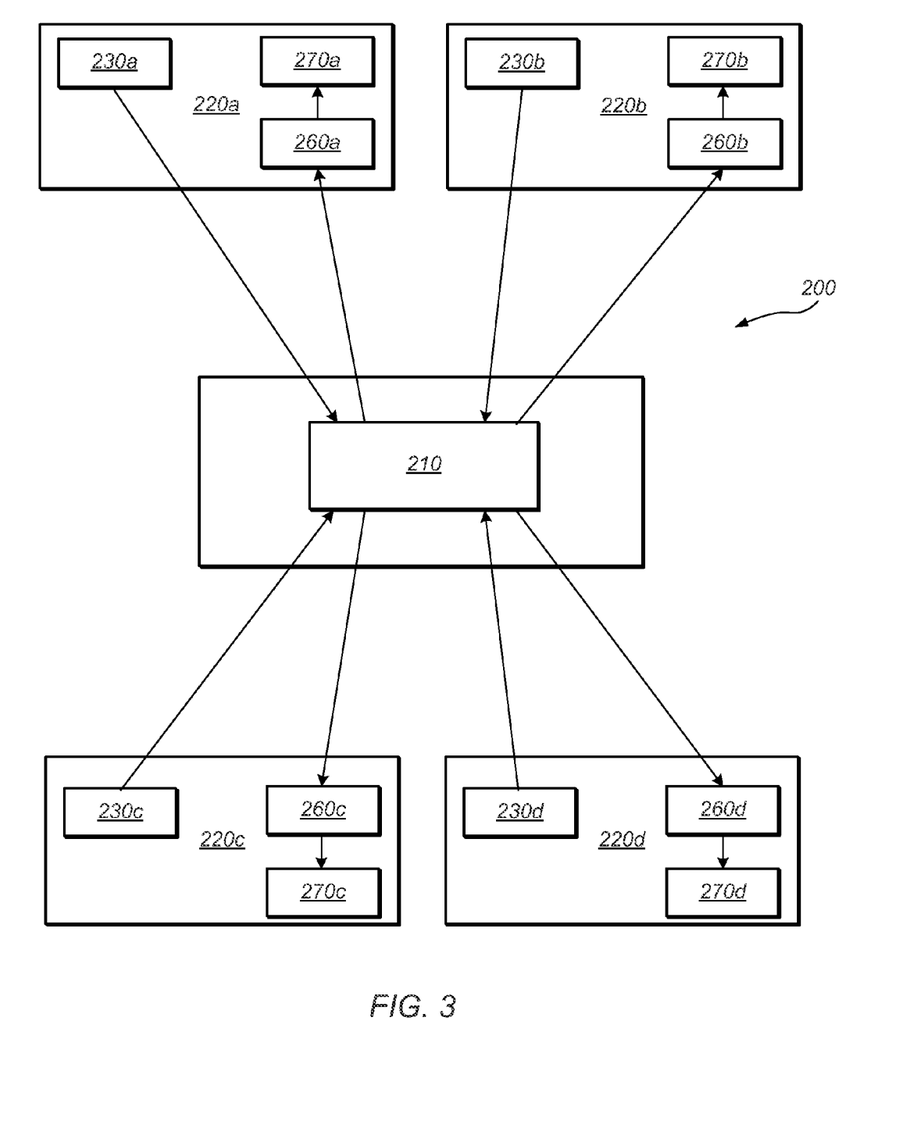
FIG. 3 depicts a diagram of an embodiment of a system including a remote server which functions to execute three-dimensional (3D) imaging software for multiple collaborators using systems with different capabilities.

FIG. 3 depicts a diagram of an embodiment of a system 200 including a remote server 210 which functions to execute 3D imaging software for multiple collaborators using systems 220a-d with different capabilities. In some embodiments, the remote server detects or assesses or otherwise is informed of the detailed capabilities of each computer system in the collaboration. In some embodiments, detected capabilities may include the type of displays 270a-d and the nature of the user input devices. Detected capabilities may include general processing power 260a-d or video processing power. Detected capabilities may include detecting each computer system's tracking capabilities 230a-d. In some embodiments, tracking capabilities may include tracking one or more types of movements of one or more types of input devices associated with a computer system. In some embodiments, input devices may include a user's body part (e.g., hands, fingers, head, torso position, arms, legs, user gaze (eye tracking) etc.). In some embodiments, an input device may include a stylus, a pen, knife, pointer, glasses (used with 3D display), 3D mouse, or other physical device whose position and/or orientation are tracked by the system.

In some embodiments, methods described herein may include collaboration among multiple users. A first 3D collaboration system (e.g., local user) may receive processed captured images of a subject and a viewpoint of a user of a second 3D collaboration system. In some embodiments, the first 3D collaboration system may also receive a digital object content and user control device (e.g., stylus) information (e.g., images, data from a gyroscope and/or accelerometer, etc.) from the second 3D collaboration system. The digital object content may be generated by the graphic space, which may be resident in the first 3D collaboration system, the second 3D collaboration system, or in a common shared server. The graphic space may be shared between the two 3D collaboration systems. The first 3D collaboration system may be located remotely from the second 3D collaboration system. The image of the user may be in any form, such as a monoscopic or stereoscopic image. Further, in one embodiment, the image received by the first 3D collaboration system may be in the form of a raw image that must be processed in order to render a stereoscopic or monoscopic image on display 150. In other embodiments, the received images may already be processed, either fully, or to some extent. In one embodiment, stylus information may include a location and a change in position/orientation of the stylus. The first 3D collaboration system may receive information regarding other tools or physical objects, like a collaborator/user's hand or arm, in addition to or other than the stylus.

The first 3D collaboration system may render the subject and a graphics object in the same view of a 3D scene. For instance, the 3D scene may integrate the digital object content, the virtual stylus, and/or an image of a physical object or the user of the different 3D collaboration system/computer system within the same view. The graphics object may be received from a graphic space shared with the second 3D collaboration system. The graphic space may reside in a variety of places, as described herein.

In one embodiment, the first 3D collaboration system may receive input (e.g., from a user) to specify a perspective view. The perspective view may be the viewpoint of the user of the other system. Accordingly, the rendering of the graphics object may be based on the specified perspective view, which is described herein, and/or the viewpoint. This viewpoint may allow the user of the first system to see digital object content, such as one or more projected objects, as the other user may see it. Such a viewpoint may be useful in a collaborative environment where two or more users participate in a video conference. In the same shared workspace, i.e., 3D scene, users may be able to have a face-to-face conversation while one or more users describe, manipulate, or alter some digital object content, with the other users being able to see those manipulations from the manipulating user's viewpoint. In some embodiments, the user control device may also be rendered in the same view of the 3D scene. For example, the location and change in position and/or orientation of a stylus may be rendered in the same view. Likewise, the change in position and/or orientation of the stylus may manipulate the rendered graphic object and as a result, the rendered graphic object may be updated as a result of the manipulation. In such embodiments, the rendered stylus and rendered graphic object and/or subject may be rendered with motion in real-time. In one embodiment, when a collaborator manipulates the virtual graphic object, information regarding the manipulation (e.g., stylus position/orientation) may be sent over the network to the local user without the collaborator system sending the whole graphic object. The local user's machine may render the updated graphic object based on the information regarding the manipulation.

The perspective view may be an alternative viewpoint, such as a "tabletop" viewpoint. A tabletop viewpoint refers to a back side view as if the user and collaborator are at opposite ends of a table. In such an embodiment, the collaborative session appears as if the users are facing each other across a table with the digital object content between them. If the user selects the alternative viewpoint, the user may employ a gradient transparency to the digital object content to allow the user to see where the collaborator is looking or manipulating the digital object content.

In one embodiment, the collaborator's stylus movements and operations may be rendered on the user's display in real-time. A virtual stylus may be rendered as may any modifications, alterations, or manipulations to any digital object content. In one embodiment, the image of the user may be a stereoscopic image. The captured image of the collaborator may be presented in the open space of the display along with any digital object content. Or the captured image of the collaborator may be presented in the closed space of display. When the captured image of the collaborator is presented in the closed space of display, in some embodiments, the presented image is positioned at a distance within the closed space representative of the distance away from the cameras that the collaborator was positioned at the time the images were taken.

The first 3D collaboration system may display the 3D scene by at least one display. For example, in one embodiment, two displays may be used to display the 3D scene. Certain portions of the 3D scene may be displayed by one of the two displays whereas other portions may be displayed by the other of the two displays. In one embodiment, the rendered, captured images may be rendered and displayed as a texture on a flat graphic. In another embodiment, the rendered, captured images may be displayed as a stereo rendering based on a head model of the graphic space.

In various embodiments, the first 3D collaboration system may receive updated captured images of the subject, an updated viewpoint of the subject, and and/or an updated position and/or orientation of a user control device (e.g., stylus). Based on the updated images and viewpoint, the 3D collaboration system may update the 3D scene. The updating may be in real-time or near real-time. For further descriptions of multiple users collaborating with 3D imaging software and systems may be found in U.S. patent application Ser. No. 13/867,245 entitled "THREE-DIMENSIONAL COLLABORATION" filed Apr. 22, 2013, which is incorporated by reference herein.

For further descriptions of a stereo display head/eye tracking system, that enables the display to convey a scene or image (in mono or stereo) based on the real time position/orientation (and changing position/orientation) may be found in U.S. patent application Ser. No. 13/679,630 entitled "HEAD TRACKING EYEWEAR SYSTEM" filed Nov. 16, 2012, U.S. patent application Ser. No. 11/141,649 entitled "MULTI-PLANE HORIZONTAL PERSPECTIVE DISPLAY" filed May 31, 2005, U.S. patent application Ser. No. 12/797,958 entitled "PRESENTING A VIEW WITHIN A THREE DIMENSIONAL SCENE" filed Jun. 10, 2010, U.S. Patent Application No. 61/426,448 entitled "THREE-DIMENSIONAL TRACKING OF OBJECTS IN A 3-D SCENE" filed Dec. 22, 2010, U.S. patent application Ser. No. 13/019,384 entitled "MODIFYING PERSPECTIVE OF STEREOSCOPIC IMAGES BASED ON CHANGES IN USER VIEWPOINT" filed Feb. 2, 2011, U.S. Patent Application No. 61/426,451 entitled "COLLABORATION SHARED PRESENCE" filed Dec. 22, 2010, each of which are incorporated by reference herein.

In some embodiments, each computer system in the collaboration transmits through a network to the Cloud server only unprocessed/minimal information relevant to their input to the collaboration. This information might, for example, include parameters describing the user's use of their input devices.

In some embodiments, the computations needed to produce the collaborative video based on this information are accomplished by the powerful CPU and GPU in the Cloud server. The cloud server may then transmit over the network back to each computer system in the collaboration a video stream that can be presented with minimal local processing.

In some embodiments, the output prepared by the server is individually prepared to be appropriate to the capabilities of each computer system in the collaboration. This may include an output that is specifically appropriate to the display in the computer system of each user. For example, one of the displays of one of the collaborating systems may not have the capability to display 3D images.

In this way, the computational burden may be shifted from each computer system in the collaboration to the much more capable Cloud server. As a consequence, variations in the capabilities of the computer systems in the collaboration may be minimized and all users can meaningfully participate in the collaboration.

While the use of a remote server and/or a Cloud server may provide many advantages for executing or at least assisting in executing 3D imaging software, there may be some disadvantages. One disadvantage may include interruption of the network over which the collaboration is occurring. Interruption of network services may occur to an individual user or to any or all members of a collaboration. The interruption of the network may include a reduction in data rate transfer through the network or a reduced quality of service. As such a method may include monitoring the network for signs of an interruption. Monitoring the network may include monitoring network latency and/or data transfer rates.

Some of the consequences of such an interruption may include an inability to access the application/program, the model, or the product of the collaboration. Examples of this might include the model in an engineering collaboration or the composite scene in a multiplayer game.

In general there are a couple of basic modes of operation of systems described herein. In a first mode of operation, the user may operate their computer system in a stand-alone configuration, all functions are carried out locally. The user input is forwarded by the tracking system to the local application. The output of the application is then rendered for presentation on the system display device.

In a second mode of operation, the user's computer system is in communication with the Cloud server. In this case, the mode of operation is as described herein above (e.g., as regards FIG. 2). The user's input may be sent by the tracking system of the local system to the Cloud server which, in turn, sends a processed video stream back to the user's decoder for presentation on the local display of the user's computer system.

Figure 4:
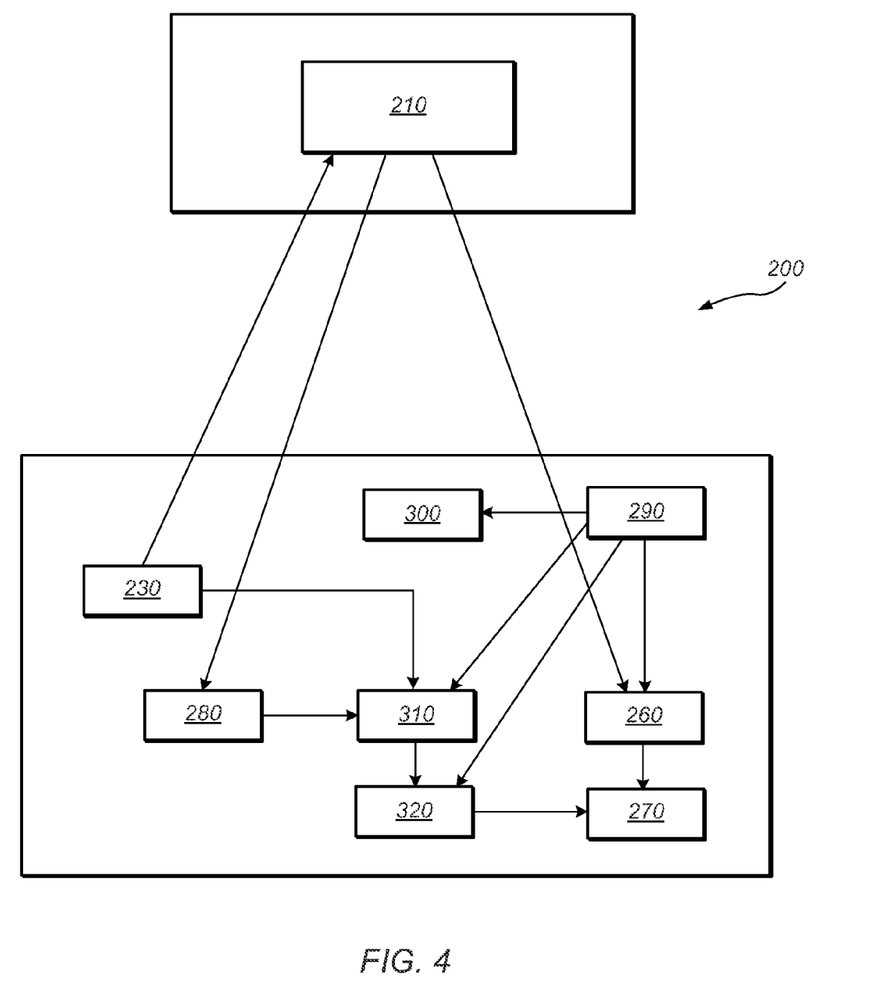
FIG. 4 depicts a diagram of an embodiment of a system including a remote server which functions to execute three-dimensional (3D) imaging software.

In some embodiments, in the second mode of operation network interruptions in communication may occur. FIG. 4 depicts a diagram of an embodiment of a system including a remote server which functions to execute 3D imaging software including during interruptions of network communication occur. In some embodiments, in the second mode of operation when network interruptions in communication occur the Cloud server may provide information to a local Scene/Model Capture or Cache 280. The information stored in the Cache may be built up utilizing available bandwidth in the network. The information may be built up in the Cache in the background while the network is operational and the 3D imaging software is executing. The information may be constantly updated as necessary. The content stored in the Cache may include video frames or it may include the data base of the collaborative product or any information related to execution of the 3D imaging software.

In some embodiments, a local Real Time Performance Measurement module 290 may monitor the flow of data from local systems to and from the Cloud or over the network. Should this module determine that the flow of data has been interrupted in some manner, then a local Handoff Control module 300 may switch the mode of operation of the local system from Cloud-based to stand-alone. In some embodiments, upon entering the stand alone mode of operation subsequent to an interruption of communication with the Cloud, the user's computer system may draw upon the information in the local Scene/Model Capture/Cache 280 to continue execution of the application 310. The application 310 may render 320 a product which is displayed on display 270. The Real Time Performance Measurement module 290 may continue monitoring the flow of data even during an interruption and notify Handoff Control module 300 when or if the flow of data from the Cloud or network resumes. The Handoff Control module 300 upon notification by module 290 may switch the mode of operation of the local system from stand-alone to Cloud-based.

In some embodiments, the system may maintain the design activity and/or the collaboration in the event of a communication slowdown. The system may be used to allow operation of a stand-alone computer system that has limited capabilities. The system may serve to reduce the required amount of communication bandwidth, local computation and storage capacity for a local system at least during the communication slowdown. In some embodiments, methods for accommodating communication slowdowns may include reducing a frame rate of the product displayed. In some embodiments, a method for accommodating communication slowdowns may include reducing the image resolution. In some embodiments, a method for accommodating communication slowdowns may include converting displayed images from 3D to 2D. In some embodiments, a method for accommodating communication slowdowns may include converting from full color to shades of grey. In some embodiments, a method for accommodating communication slowdowns may include, in conjunction with head/eye tracking, providing a high resolution image only to the gaze point of the user (that is, to the "foveal" point of view) and using reduced resolution in other portions of the provided image.

In this patent, certain U.S. patents, U.S. patent applications, and other materials (e.g., articles) have been incorporated by reference. The text of such U.S. patents, U.S. patent applications, and other materials is, however, only incorporated by reference to the extent that no conflict exists between such text and the other statements and drawings set forth herein. In the event of such conflict, then any such conflicting text in such incorporated by reference U.S. patents, U.S. patent applications, and other materials is specifically not incorporated by reference in this patent.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A non-transitory computer readable storage medium containing program instructions executable by a processor of a first system to:
   access, over a network, a three-dimensional (3D) imaging software package on a remote server, wherein the remote server is configured to assess capabilities of the first system;
   display an output of the 3D imaging software based on the assessed capabilities of the first system;
   receive, over the network from a second system, a viewpoint of a user of a graphics object displayed by the second system, wherein the remote server is configured to assess the capabilities of the second system, and wherein the second system is configured to display the output of the 3D imaging software based on the assessed capabilities of the second system;
   render the graphics object from the viewpoint of the user of the graphics object in a stereoscopic 3D scene;
   track, using one or more tracking sensors, a viewpoint of a user of the first system; and
   adjust a projection of the graphics object such that the projection is in accordance with the viewpoint of the user of the first system.

2. The non-transitory computer readable storage medium of claim 1, wherein the program instructions are further executable by a processor to:
   receive data from the accessed 3D imaging software package such that in the event of an interruption in the network, the first system continues executing at least a portion of the accessed 3D imaging software package previously executed by the remote server before the interruption in the network.

3. The non-transitory computer readable storage medium of claim 2, wherein the interruption of the network comprises a reduction in data rate transfer through the network.

4. The non-transitory computer readable storage medium of claim 2, wherein the program instructions are further executable by a processor to:
   monitor the network, wherein monitoring the network comprises monitoring network latency between the first system and the remote server.

5. The non-transitory computer readable storage medium of claim 1, wherein the program instructions are further executable by a processor to:
   send, to the remote server, data regarding the viewpoint of the user of the first system, wherein the remote server is configured to assess where the viewpoint of the user of the first system will be based on the data.

6. The non-transitory computer readable storage medium of claim 1, wherein the program instructions are further executable by a processor to:
   adjust a change in projection of the graphics object such that the changed projection is in accordance with the tracked changed viewpoint of the user of the first system.

7. The non-transitory computer readable storage medium of claim 1, wherein the remote server comprises cloud computing.

8. The non-transitory computer readable storage medium of claim 1, wherein the remote server comprises cloud computing comprising distributed computing over a network.

9. The non-transitory computer readable storage medium of claim 1, wherein the program instructions are further executable by a processor to:
   execute a first portion of the 3D imaging software based on the assessed capabilities of the first system, wherein the remote server is configured to execute a second portion of the 3D imaging software based on the assessed capabilities of the first system.

10. The non-transitory computer readable storage medium of claim 1, wherein the program instructions are further executable by a processor to:
  adjust an output of the 3D imaging software based on assessed incompatible portions of the 3D imaging software.

11. A method for locally accessing three-dimensional (3D) imaging software on a remote server, comprising:
  a first system,
    accessing, over a network, a 3D imaging software package on a remote server, wherein the remote server is configured to assess the capabilities of the first system;
    displaying an output of the 3D imaging software based on the assessed capabilities of the first system;
    receiving, over the network from a second system, a viewpoint of a user of a graphics object displayed by the second system, wherein the remote server is configured to assess the capabilities of the second system, and wherein the second system is configured to display the output of the 3D imaging software based on the assessed capabilities of the second system;
    rendering the graphics object from the viewpoint of the user of the second system in a stereo 3D scene;
    tracking, using one or more tracking sensors, a viewpoint of a user of the first system; and
    adjusting a projection of the graphics object such that the projection is in accordance with the viewpoint of the user of the first system.

12. The method of claim 11, further comprising:
  the first system sending, to the remote server, data regarding the viewpoint of the user associated with the first system, wherein the remote server is configured to assess where the viewpoint of the user associated with the first system will be based on the data.

13. The method of claim 11, further comprising:
  the first system adjusting a change in projection of the graphics object such that the changed projection is in accordance with the tracked changed viewpoint of the user of the first system.

14. A system for locally accessing three-dimensional (3D) imaging software on a remote server, comprising:
  a network interface configured to couple to a network, wherein the network comprises the remote server and a second system;
  a display; and
  at least one processor coupled to the network interface and the display, wherein the at least one processor is configured to:
    access, via the network interface, a 3D imaging software package on the remote server, wherein the remote server is configured to assess the capabilities of the first system;
    display, via the display, an output of the 3D imaging software based on the assessed capabilities of the first system;
    receive, via the network interface from the second system, a viewpoint of a user of a graphics object displayed by the second system, wherein the remote server is configured to assess the capabilities of the second system, and wherein the second system is configured to display the output of the 3D imaging software based on the assessed capabilities of the second system;
    render the graphics object from the viewpoint of the user of the second system in a stereoscopic 3D scene;
    track, using one or more tracking sensors, a viewpoint of a user of the first system; and
    adjust a projection of the graphics object such that the projection is in accordance with the viewpoint of the user of the first system.

15. The system of claim 14, wherein the at least one processor is further configured to:
  receive, via the network interface, data from the accessed 3D imaging software package such that in the event of an interruption in the network, the at least one processor continues executing at least a portion of the accessed 3D imaging software package previously executed by the remote server before the interruption in the network.

16. The system of claim 15, wherein the at least one processor is further configured to:
  monitor the network, wherein monitoring the network comprises monitoring network latency between the first system and the remote server.

17. The system of claim 14, wherein the at least one processor is further configured to:
  send, to the remote server via the network interface, data regarding the viewpoint of the user of the first system, wherein the remote server is configured to assess where the viewpoint of the user of the first system will be based on the data.

18. The system of claim 14, wherein the at least one processor is further configured to:
  adjust a change in projection of the graphics object such that the changed projection is in accordance with the tracked changed viewpoint of the user of the first system.

19. The system of claim 14, wherein the at least one processor is further configured to:
  execute a first portion of the 3D imaging software based on the assessed capabilities of the first system, wherein the remote server is configured to execute a second portion of the 3D imaging software based on the assessed capabilities of the first system.

20. The system of claim 14, wherein the at least one processor is further configured to:
  adjust an output of the 3D imaging software based on assessed incompatible portions of the 3D imaging software.

* * * * *